United States Patent
Koyama et al.

(10) Patent No.: US 6,947,553 B2
(45) Date of Patent: Sep. 20, 2005

(54) COMMUNICATION SYSTEM FOR CONTROLLING TRAINING OF ECHO CANCELLER AND LINE SWITCHING SYSTEM

(75) Inventors: Kazuhiko Koyama, Tokyo (JP); Kazuya Suzuki, Tokyo (JP)

(73) Assignee: NEC Corporation (JP)

( * ) Notice: Subject to any disclaimer, the term of this patent is extended or adjusted under 35 U.S.C. 154(b) by 73 days.

(21) Appl. No.: 10/459,227

(22) Filed: Jun. 11, 2003

(65) Prior Publication Data
US 2003/0231762 A1 Dec. 18, 2003

(30) Foreign Application Priority Data
Jun. 13, 2002 (JP) ........................................ 2002-173259

(51) Int. Cl.⁷ ............................................... H04M 9/08
(52) U.S. Cl. ............................ 379/406.1; 379/406.01; 379/406.02; 379/405.04; 379/406.05; 379/406.07; 379/406.08; 379/406.09
(58) Field of Search ........................ 379/406.01–406.16

(56) References Cited

U.S. PATENT DOCUMENTS 5,414,763 A * 5/1995 Hirata ........................ 379/242
5,740,242 A * 4/1998 Hayashi .................... 379/406.1
6,147,979 A * 11/2000 Michel et al. ............... 370/292

FOREIGN PATENT DOCUMENTS

JP 3-188718 8/1991

* cited by examiner

*Primary Examiner*—Sinh Tran
*Assistant Examiner*—Ramnandan Singh
(74) *Attorney, Agent, or Firm*—Ostrolenk, Faber, Gerb & Soffen, LLP

(57) ABSTRACT

A communication system being made up of a two-wire/four-wire hybrid circuit, an echo canceller, and a control device and having functions of forming a plurality of communication paths and changing communication paths is provided which is capable of ensuring high speech quality by suppressing and canceling an echo occurring in telephone speech after establishment of path connection. The communication system also includes a training signal source to feed a training signal to the echo canceller, a switching circuit to do switching of a signal to be fed to the echo canceller between an ordinary signal and the training signal, and a control device to exert control on path connection and path changing and to feed the training signal to the switching circuit to make a training signal be fed from the training signal source to the echo canceller and to have the echo canceller converge its training operation.

9 Claims, 4 Drawing Sheets

COMMUNICATION SYSTEM FOR CONTROLLING TRAINING OF ECHO CANCELLER AND LINE SWITCHING SYSTEM

BACKGROUND OF THE INVENTION

1. Field of the Invention

The present invention relates to a communication system having an echo canceller for telecommunication lines and a line switching system.

The present application claims priority of Japanese Patent Application No. 2002-173259 filed on Jun. 13, 2002, which is hereby incorporated by reference.

2. Description of the Related Art

Conventionally, a communication system is available which includes a two-wire type transmission path and a four-wire type transmission path in a mixed manner, a two-wire/four-wire hybrid circuit (that is, a switching circuit between the two-wire type transmission path and the four-wire type transmission path, also being called "hybrid transformer") to connect the two-wire type transmission path to the four-wire type transmission path, and an echo canceller (to be used for communication lines) to suppress an echo occurring due to diffraction of a signal in the two-wire/four wire hybrid circuit. Its typical example is a telephone line system or a like. Such a kind of the communication system, for example, employs both the two-wire type transmission path as a subscriber line to connect a plurality of telephone terminals to a switching device and a four-wire type transmission path as a central office line among switching devices.

Let it be here assumed that there is a case where, in the communication system as described above in which a two-wire type line and a four-wire type line exist in a mixed manner and which has a hybrid circuit and an echo canceller and, particularly, in a voice communication network of a line-switching type, a signal is transmitted between two points through both the two-wire type line and the four-wire type line and telephone speech is carried out via a communication connection (being also called "connection" or "call connection") between communication terminal devices (that is, telephone sets) in particular. A path between the two points is set by a path setting process of a line switching processing section or of a switching device having a line switching function.

In the case of a transmission path (speech path) with a two-wire/four-wire hybrid circuit being connected in between, an echo is produced due to diffraction of a signal in the four-wire type transmission path and the two-wire/four-wire hybrid circuit. FIG. 5 shows a state in which the echo is produced in the transmission path with the two-wire/four-wire hybrid circuit 51 being connected in between. In the four-wire type transmission path 52, transmitting and receiving of signals are handled independently by using a separate line and, in the two-wire type transmission path 53, transmitting and receiving of signals are handled simultaneously by using a same line. As shown in FIG. 5, the two-wire type transmission path 53 is connected to the four-wire type transmission path 52 with the two-wire/four-wire hybrid circuit 51 being connected between them. A signal that passes through two lines installed on a lower side 52a (in the same figure) of four transmission path 52 is transmitted through the two-wire/four-wire hybrid circuit 51 to the two-wire type transmission path 53. A signal passing toward a direction of the two-wire/four-wire hybrid circuit 51 is transmitted through the two-wire/four-wire hybrid circuit 51 to the two lines installed on an upper side 52b (in the same figure) of the four-wire type transmission path 52 and reaches a receiver in the communication.

In the case of the transmission path with the two-wire/four-wire hybrid circuit 51 being connected between the two-wire type transmission path 53 and the four-wire type transmission path 52, an echo path is formed due to impedance mismatch in the two-wire/four-wire hybrid circuit 51. The echo is produced depending on a transmission characteristic of the echo path. As shown in FIG. 5, one part of the signal passing through the two lines installed on the lower side 52a of the four-wire type transmission path 52 reaches the two-wire type transmission path 53 through the two-wire/four-wire hybrid circuit 51, however, another part of the signal diffracts, in the two-wire/four-wire hybrid circuit 51, into a receiving signal passing through the two lines installed on the upper side 52b of the four-wire type transmission path 52. This diffraction causes formation of an echo path being turned back toward the four-wire type transmission path 52 (and toward communication terminals existing ahead) on the right in the same figure. An echo component caused by a transmitted signal (that is, transmitted speech) passing through the two lines installed on the lower side 52a of the four-wire type transmission path 52, together with a received signal (that is, received speech) passing through the two-wire type transmission path 53, reaches the two lines installed on the upper side 52b of the four-wire type transmission path 52.

In a front stage of the two-wire/four-wire hybrid circuit 51, if a transmission delay between the received signal and the transmitted signal is small, a time interval between the transmitted speech and an echo is short and, therefore, the echo is not recognized as a sound that can be heard at a communication terminal on a side of the four-wire type transmission path 52. However, if there is a large transmission delay between the received signal and the transmitted signal, the time interval between the transmitted speech and the echo is shifted, which causes the echo to be heard remarkably at the communication terminal and causes degradation in speech quality.

In order to suppress the echo occurring in the two-wire/four-wire hybrid circuit 51 existing on a speech path, an echo canceller 54 (to be used in communication circuits) is placed in the four-wire type transmission path 52 on the speech line, which cancels the echo passing from a direction of the two-wire/four-wire hybrid circuit 51. FIG. 5 shows configurations of the echo canceller 54 to be used in communication circuits. The echo canceller 54 shown in FIG. 5 performs training so as to learn a transmission characteristic of an echo path based on an input of a transmitting signal and to produce a pseudo-echo signal. By subtracting the produced pseudo-echo signal from a signal coming through the echo path from a direction of the two-wire/four-wire hybrid circuit 51, an echo component contained in a received signal passing through the two lines installed on an upper side 52b of the four-wire type transmission path 52 is suppressed and canceled. The echo canceller 54 is made up of an adaptive filter, subtractor, or a like (not shown).

However, the echo canceller 54 cancels an echo by learning a transmission characteristic of an echo path via training in a state in which the echo path exists and, therefore, time is required for completion of the training to learn the characteristic of the echo path before a training operation of the echo canceller 54 is converged, that is, the echo canceller 54 is put into a state in which it can cancel the echo. In a state existing immediately after connection is established to speak between communication terminals in a voice communication system (and immediately after an echo path is formed at a same time), that is, at time immediately after speech becomes enabled, training to learn the transmission characteristic of the echo path is not yet performed and an echo canceling function is not effective at this point. As a result, the echo is produced at an early stage of start of speech. As shown in FIG. 5, in the echo canceller 54 to be used in communication circuits, a transmitting signal passing through the two lines on the lower side 52a of the four-wire type transmission path 52 is used as an input and the training operation is converged based on the input.

As in the case of a method employed in Japanese Patent Application Laid-open No. Hei 3-188718, the method becomes effective in which the echo canceller performs training to learn the transmission characteristic of the echo path formed after establishment of connection by using the training signal fed to the echo canceller from a training signal source after connection has been established to smoothly cancel the echo.

In technology disclosed in the above patent application, the specified training signal source is placed on an input side of the echo canceller to be used in communication circuits on a four-wire type transmission path. After the establishment of connection, control is exerted so that the training signal is output to the echo canceller from the training signal source and so that the echo canceller performs a training operation based on the training signal and converges its training operation. After the training operation of the echo canceller has converged, speech is made possible in a state in which the echo canceling function is effectively achieved.

By employing such the training method to be performed by the echo canceller described above, training operations can promptly converge before actual speech by a telephone speaker is started, thus successfully suppressing the echo and improving speech quality. However, in the above communication system, connection between communication terminals (telephone sets) housed in a switching device is not limited to cases of origination (transmission of a signal) and termination (receipt of a signal) and, in some cases, connection has to be changed using a function of switching or a like in the switching device. The switching function represents a function of changing a path for calling connection by switching the path using a switch in the switching device, with calling connection between communication terminals being still maintained. When the path is changed, the echo path is also changed.

Since the technology disclosed in the above patent application does not provide a countermeasure against connection with the path being changed, the training operation to be performed on a newly formed echo path is not completed after the path has been changed and during time before the training operation is performed on the new path by the echo canceller and before the training operation converges, the echo is heard during telephone speech.

A first problem in the conventional technology is that, if a path is changed for signal transfer in connection between communication terminals, though the echo canceller performed a training operation and had an effective function of suppressing and canceling the echo at time of first establishment of connection, after the change of the path, it has no effective echo suppressing function during time before the training operation is completed and converged and, as a result, it is inevitable that the echo is heard at an early stage of start of speech following the change of the path.

This is because, in the conventional technology, the training operation is started based on a driving signal by the echo canceller only when the speech path is established for originating connection and terminating connection and, if the path is changed by a line switching function of the switching device with connection between communication terminals being maintained (that is, without being disconnected), an echo canceller's training operation to learn the transmission characteristic of a newly formed echo path is not performed.

A second problem is that, since, in the conventional technology, a driving signal is fed from the switching device to a training signal source connected to the four-wire type transmission path to cause the training signal to be supplied to the echo canceller for communication circuits, the control line used to control driving of the training signal for every echo canceller for communication circuits, in addition to the speech line, has to be prepared.

This is because, in the conventional technology, though a function of feeding the training signal to the echo canceller is controlled originally by the switching device, the feeding function is prepared as a separate function being different from presently-available functions (such as line switching functions, path changing functions and other various service functions) of the switching device.

SUMMARY OF THE INVENTION

In view of the above, it is an object of the present invention to provide a communication system having both a two-wire type transmission path and a four-wire type transmission path mounted in a mixed manner, a two-wire/four-wire hybrid circuit to switch signal connection between the two-wire type transmission path and the four-wire type transmission path, and an echo canceller being connected to the four-wire type transmission path which operates to suppress an echo caused by diffraction of a signal in the two-wire/four-wire hybrid circuit and having functions of controlling connection among a plurality of transmission paths (that is, of controlling line switching operations) through switching control using a switch, which is capable of ensuring high speech quality by suppressing and canceling an echo occurring in telephone speech after establishment of path connection. It is also an object of the present invention to provide the communication system which is capable of maintaining high speech quality without being influenced by a change of a path to be made according to a path switching function for communication connection.

According to a first aspect of the present invention, there is provided a communication system including a two-wire/four-wire hybrid circuit and an echo canceller being placed on a four-wire type transmission path to suppress an echo occurring due to diffraction of a signal in the two-wire/four-wire hybrid circuit, and having functions of connecting a plurality of paths and changing the paths through a two-wire type line and four-wire type line by switching control on a time-division switch to be exerted by a control device, the communication system including:

a training signal source to output a training signal to the echo canceller;

a switching circuit to do switching of a signal to be fed to the echo canceller between an ordinary signal and the training signal; and wherein the control device exerts control on connection and changing of the path and on switching of the switching circuit to have the training signal source feed the training signal to the echo canceller, the echo canceller may perform and complete a training operation.

In the foregoing, a preferable mode is one wherein the control device, every time a path is newly formed and immediately after the path has been formed, exerts switching control on the switching circuit so as to feed the training signal to the echo canceller so that the echo canceller performs a training operation.

Also, a preferable mode is one wherein the control device has a function of changing a path with call connection being still established and has the echo canceller perform a training operation every time a path is changed by the function of changing a path.

According to a second aspect of the present invention, there is provided a line switching system for switching between a two-wire type line and a four-wire type line including:

a two-wire/four-wire hybrid circuit being placed in a two-wire type line interface device connected to the two-wire type line;

an echo canceller, a training signal source, and a switching circuit being placed in a four-wire type line interface device connected to the four-wire type line;

a control device to exert control on each of the interface devices and a time-division switch to perform processing of switching lines for voice speech through the two-wire type line and the four-wire type line;

wherein the control device, when a path is set for speech connection through the two-wire type line and the four-wire type line, exerts switching control on the switching circuit making up the four-wire type line interface device so as to feed a training signal to the echo canceller to have the echo canceller perform a training operation.

In the foregoing, a preferable mode is one wherein the control device, every time a path is newly formed and immediately after the path has been formed, exerts switching control on the switching circuit so as to feed the training signal to the echo canceller so that the echo canceller performs and complete a training operation.

Also, a preferable mode is one wherein the control device has a function of changing a path with call connection being established and, when the path is changed, exerts switching control on the switching circuit of the four-wire type line interface device so as to feed the training signal to the echo canceller so that the echo canceller performs a training operation.

With the above configurations, in a communication system made up of a two-wire/four-wire hybrid circuit, an echo canceller, and a two-wire type line and a four-wire type line connected in a mixed manner and having a line switching function and a path changing function, it is possible to ensure high quality speech in a continuous manner at time of speech with an echo being successfully suppressed and cancelled. This is because, even when a path is first formed between terminals in communication connection and even when the path once formed is changed by a line switching function of a line switching processing unit, a training signal is fed to have the echo canceller perform a training operation to learn a transmission characteristic of an echo path immediately after formation or change of the communication path and, as a result, time required to make a training operation of the echo canceller converge can be shortened, thus enabling an echo suppressing and canceling function to be promptly effective. This is also because, by mounting the echo canceller and a training signal source within a line switching processing unit having various kinds of functions of switching communication line, of changing communication path, and performing other services and a like in the communication system of the present invention and by having its control device exert control on start of the training operation of the echo canceller to lean a transmission characteristic of a new echo path, it is made possible to take an immediate and prompt measure when a communication path is changed.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Embodiment

Figure 1:
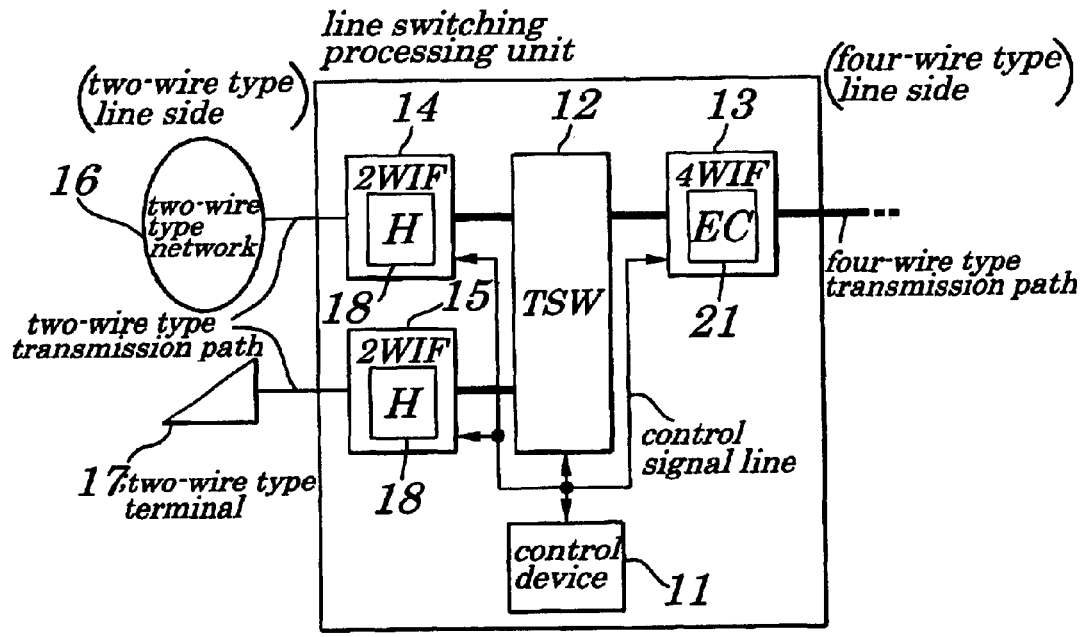
FIG. 1 is a schematic block diagram showing configurations of a communication system according to an embodiment of the present invention.

FIG. 1 is a schematic block diagram showing configurations of a communication system according to an embodiment of the present invention. As shown in FIG. 1, the communication system of the embodiment includes a two-wire type transmission path (not numbered), a four-wire type transmission path (not numbered), both being mounted in a mixed manner in the same communication system as its line switching processing unit 10. The line switching processing unit 10 serves as a line switching system employed in the embodiment of the present invention which exerts control on an echo canceller 21 in the communication system.

The communication system of the embodiment makes up a part of a line-switching type voice communication network (not shown). In the communication system, each of two-wire/four-wire hybrid circuits 18 (shown respectively by "H" in FIG. 1) interconnects a communication line made up of a two-wire type transmission path and another communication line made up of a four-wire type transmission path (not numbered), the echo canceller 21 (shown by "EC" in FIG. 1) is connected on the four-wire type transmission path (not numbered) to suppress and cancel an echo caused by diffraction of a signal in the two-wire/four-wire hybrid circuit 18, and a time-division switch 12 (shown by "TSW" in FIG. 1) and a control device 11 to control connection and changing of a path, that is, switching of lines being used for speech between communication terminals (not shown) (telephones). Moreover, the line switching processing unit 10 has a function of changing paths for communication connection. In FIG. 1, the four-wire type transmission path (not numbered) on a side of each two-wire/four-wire hybrid circuit 18 is shown as bold lines, and the two-wire type transmission path on an opposite side of each two-wire/four-wire hybrid circuit 18 is shown respectively as a thin line.

The communication system of this embodiment which has the two-wire type transmission path and the four-wire type transmission path in which these connection paths may be changed, can suppress and cancel the echo during actual telephone speech by feeding a training signal to the echo canceller 21 so that the echo canceller 21 can perform a prompt training operation and so that time required for having training operation converge is shortened every time path connection is established, as including time the path is changed.

The line switching processing unit 10 in FIG. 1 includes each of components that perform the above functions. The line switching processing unit 10, which is called so for convenience sake in FIG. 1, which, however, serves actually as a switching device which can be incorporated in a communication network (not shown). Operations of the line switching processing unit 10 are described below, however, the present invention is not limited to the line switching processing unit 10. In the line switching processing unit 10, processing of establishing connection is performed both on a two-wire type line side and on a four-wire type line side and processing of establishing connection is also performed between terminals on the two-wire type line side.

Two-wire type line interface devices 14 and 15 (shown as "2WIF" in FIG. 1) are connected through the time-division switch 12 to a four-wire type line interface device 13 (shown as "4WIF" in FIG. 1). Each of these line interface devices serves as an interface in the line switching processing unit 10 to connect the two-wire type transmission path or the four-wire type transmission path. The two-wire type line interface device 14 is connected through the two-wire type transmission path to a two-wire type line network 16. The two-wire type line interface device 15 is connected through the two-wire type transmission path to a two-wire type terminal 17. Here, the two-wire type terminal 17 represent communication terminals being connected through the two-wire type transmission path. The four-wire type line interface device 13 serves as an interface to connect four-wire type line networks or terminals which are connected to the four-wire type transmission path. In the embodiment of the present invention, two pieces of the two-wire type line interface devices 14, 15 on the two-wire type line side are connected. However, the present invention is not limited to the two pieces of the two-wire type line interface devices, and a plurality of line interface devices may be incorporated on the two-wire type line side. In the communication system shown in FIG. 1, by using the line switching processing unit 10, a plurality of transmission paths for communication connection can be formed and switched. Each of the two-pieces of the two-wire type line interface devices 14 and 15 includes the two-wire/four-wire hybrid circuit 18. The two-wire/four-wire hybrid circuits 18 connect the two-wire type transmission path and the four-wire type transmission path, and serve as hybrid transformer. Then an echo path is formed in the two-wire/four-wire hybrid circuit 18 due to diffraction of a signal transmitted through the four-wire type transmission path. The two-wire type line interface device 14 has functions of providing an interface between a unit for originating (transmission of a signal) and a unit for terminating (receipt of a signal) to and from the two-wire type line network 16 and of informing the control device 11 of a state of the two-wire type line network 16. The two-wire type line interface device 15 has a function of providing an interface between a unit for originating and a unit for terminating to and from the two-wire type terminal 17 and of informing the control device 11 of a state of the two-wire type terminal 17.

The four-wire type line interface device 13 on the four-wire type line side includes the echo canceller 21. Moreover, though not shown in the drawing, a specified interface circuit that can correspond to the four-wire type line may be placed. The four-wire type line interface device 13 has a function of providing an interface between a unit for originating and a unit for terminating to and from the terminals of informing the control device 11 of the state of the four-wire type line and the terminal.

The control device 11 controls the entire line switching processing unit 10 by setting, controlling, and monitoring each of the components in the line switching processing unit 10 through a control signal line (not shown). The control device 11 in particular mainly performs a line switching process by switching control on the time-division switch 12. Each of the two-wire type line interface devices 14 and 15, and the four-wire type line interface device 13 in the line switching processing unit 10, when a request for originating connection or terminating connection is made, informs the control device 11 of a present state and the control device 11 recognizes the present state of each of the line interface devices. For example, each of the line interface devices, when recognizing the originating call or terminating call by a signal fed from an outside, informs the control device 11 of them. The control device 11 performs the line switching process by switching the time-division switch 12 based on notification of a state fed from these line interface devices. Moreover, the control device 11 exerts control on various service processes including a process of line switching, changing a path or a like. According to the switching function, speech path is changed with communication connection among terminals (call connection) being still maintained. At this point, also, switching is done by controlling the time-division switch 12.

The control device 11 in the communication system of the embodiment exerts control on functions of processing switching communication lines, changing a path or a like and on training to be performed by the echo canceller 21. The communication system of the embodiment feeds a training signal to the echo canceller 21, immediately after formation of a speech path for call connection between terminals, and has the echo canceller 21 perform a prompt training operation in order to suppress and cancel an echo. Moreover, after a speech path for call connection has been once formed among terminals, even if a path is changed with the connection being still maintained (that is, without being disconnected), by feeding a training signal to the echo canceller 21 and having the echo canceller 21 perform a prompt training operation to learn a transmission characteristic of a new echo path, an echo suppressing function is speedily started to put the echo canceller 21 into an effective state. This enables telephone speech to start in an effective state of the echo suppressing function and, even if a path is changed in a mid-course, an echo suppressing function is operated promptly and high speech quality being free from an echo is maintained all the time.

Figure 2:
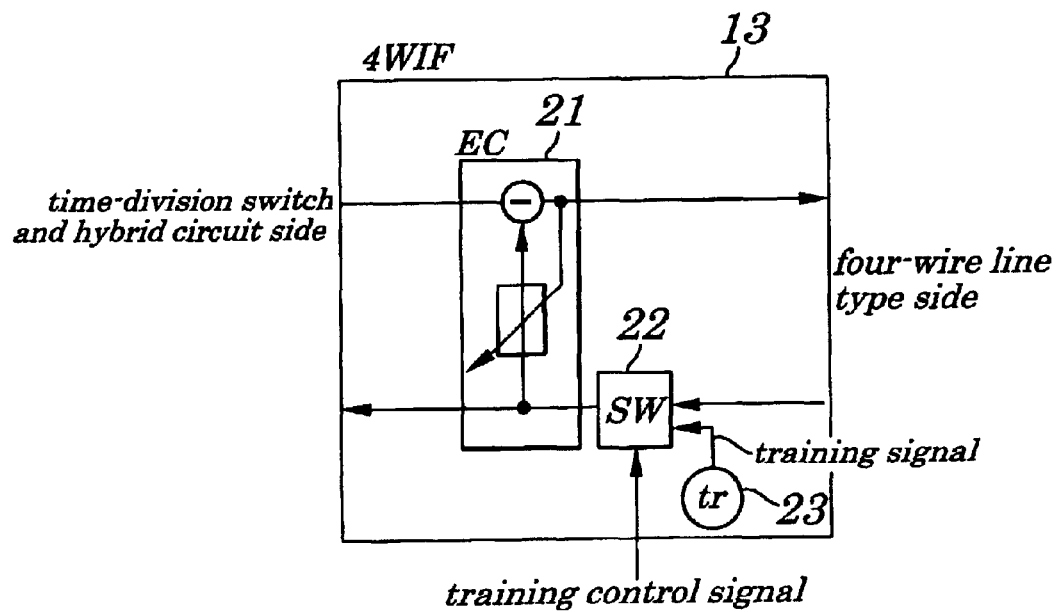
FIG. 2 is a diagram showing configurations of a four-wire type line interface device of the embodiment of the present invention.

FIG. 2 is a diagram showing configurations of the four-wire type line interface device 13 of the embodiment of the present invention. The four-wire type line interface device 13 has the echo canceller 21 (EC), a training signal source 23 (shown as "tr" in FIG. 2), and a switch circuit 22 (shown as "SW" in FIG. 2). The switch circuit 22 is controlled by a control signal line and a control signal (training control signal (not numbered) in FIG. 2) fed from the control device 11. As shown in FIG. 2, the four-wire type transmission path (not numbered) is made up of a transmission path (not numbered) on an upper side and a transmission path (not numbered) on a lower side in which one is for transmission of a signal and another is for receipt of a signal.

The echo canceller 21 is made up of an adaptive filter, a subtractor, and a like (not shown), and has a function of suppressing and canceling an echo caused by diffraction of a signal in the two-wire/four-wire hybrid circuit 18 being placed on the side of the two-wire type line interface device (on the two-wire type line side). The echo canceller 21 uses, at ordinary time, a transmitting signal fed from the side of the four-wire type lines 14,15 as an ordinary input. The echo canceller 21 performs a training operation to learn a transmission characteristic of an echo path based on an input and produces a pseudo-echo signal. The echo canceller 21 outputs a pseudo-echo signal and subtracts the pseudo-echo signal from a signal fed from a direction of the time-division switch 12, that is, from a direction of the two-wire/four-wire hybrid circuit 18. This causes an echo component contained in a transmitting signal (a receiving signal on the four-wire type line side) to be suppressed and canceled.

The switch circuit 22 is placed in a front portion of an input side of the echo canceller 21. To the switch circuit 22 are input an ordinary input fed from the four-wire type line side and a training signal fed from the training signal source 23 and inputting is switched based on a control exerted by the control device 11. Immediately after formation of a path, a training control signal is input to the switch circuit 22 from the control device 11. The training control signal is a trigger signal to instruct a training signal to be fed to the echo canceller 21. The switch circuit 22 switches an input based on a training control signal and, as a result, an input is switched from an ordinary signal to a training signal fed from the training signal source 23.

The training signal source 23 is a part to output a specified signal for training use in the echo canceller 21.

The control device 11 of the communication system of the embodiment exerts control on mainly other functions such as line switching and path changing functions and, at a same time, every time a communication path is changed, controls a supply of a training signal to the echo canceller 21. The control device 11, immediately after communication connection has been first established between terminals and immediately after speech connection has been switched to form a new path with call connection being maintained, a training control signal (not numbered) is transmitted to the four-wire type line interface device 13 (that is, its to switch circuit 22). This causes the switch circuit 22 to be switched so that an ordinary signal to the echo canceller 21 is switched to a training signal fed from a training signal source. Since a training signal is fed to the echo canceller 21, a training operation is performed in a manner so as to correspond to an echo path formed by formation of a path and converges in a predetermined period of time. By converging of the training operation, an echo suppressing function is put into an effective state. The switch circuit 22 is switched again with timing with which a training operation is completed by the echo canceller 21 to again change the input to the original input.

Immediately after connection through the four-wire type line interface device 13 has been established and immediately after a new path has been formed, a control signal (training control signal (not labeled)) to instruct a training operation to be started (that is, training signal is fed) by the echo canceller 21 is transmitted from the control device 11 to the four-wire type line interface device 13. This control signal is transmitted immediately after a terminal with which communication to be carried out has established connection and has responded and immediately after a terminal with which communication is to be carried out has responded due to a path change occurred by a switching function in communication connection.

Thus, by supplying a training signal immediately before actual start of speech immediately after establishment of a transmission path to have the echo canceller 21 perform a training operation and by completing a training operation to suppress an echo path and an echo occurring in the two-wire/four-wire hybrid circuit 18 (being placed in the two-wire type line interface devices 14 and 15 on the two-wire type line side in the embodiment), speech with an echo being suppressed can be ensured after a training operation is completed (converged).

Not only when path connection between terminals is first established but also when speech path is switched with connection being maintained which causes an echo path to be changed, a training operation of the echo canceller 21 is completed and the echo canceller 21 is put into a state where its echo suppressing function is effective.

Figure 3:
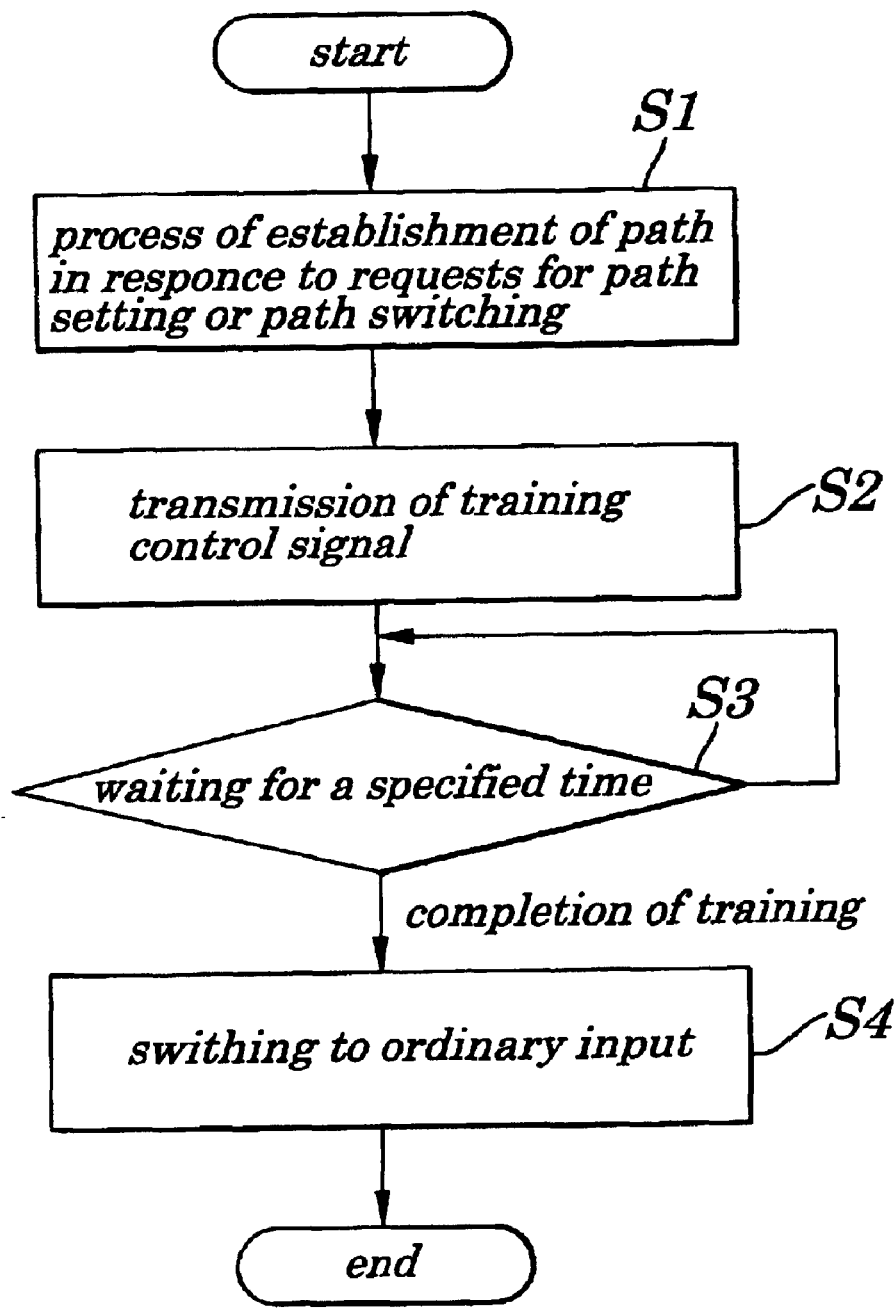
FIG. 3 is a flowchart explaining an outline of procedures for training operations by an echo canceller in the communication system according to the embodiment of the present invention.

FIG. 3 is a flowchart explaining an outline of procedures for training operations by the echo canceller 21 in the communication system of the embodiment.

When there is a request or a need for path formation or path changing in communication connection through the four-wire type line interface device 13 in the line switching processing unit 10 including origination (transmission of a signal) and termination (receipt of a signal) from the two-wire type line side or from the four-wire type line side or changing of a path being under connection by using the switching function, path connection processing is established (Step S1) by switching control on the time-division switch 12 by the control device 11 according to a specified procedure. This enables setting of a specified path through the four-wire type line interface device 13.

Next, a response from a person with whom speech is made after a specified path has been set in the process of forming a path is given to the line switching processing unit 10 and the control device 11, the control device 11 transmits a training control signal to instruct the four-wire type line interface device 13 (that is, the switch circuit 22) to feed a training signal to the echo canceller 21 (Step S2). Based on this, the four-wire type line interface device 13 has the switch circuit 22 to do switching of a signal to be fed to the echo canceller 21 between an ordinary signal and a training signal to be fed from the training signal source 23. When the echo canceller 21 is connected to the training signal source 23 by switching operation of the switch circuit 22, the training signal is fed to the echo canceller 21. This causes the echo canceller 21 to start a training operation to learn a transmission characteristic of an echo path newly formed, every time a path is changed.

The four-wire type line interface device 13, after having started feeding a training signal to the echo canceller 21, waits for a specified short time (Step 3). This specified short time represents time during which the echo canceller 21 completes the training operation and the training operations converge. After the echo canceller 21 has completed the training operation (Step S3: completion of training operation), the switch circuit 22 is switched so as to receive an ordinary signal (Step S4). At this point, a state occurs where the functions of suppressing and canceling an echo are enabled and during speech thereafter an echo can be suppressed and canceled. Moreover, the above waiting process may be also expressed as a process in which the switch circuit 22 switches inputting for a specified period of time or as a process in which a training signal is fed for a specified period of time.

Figure 4:
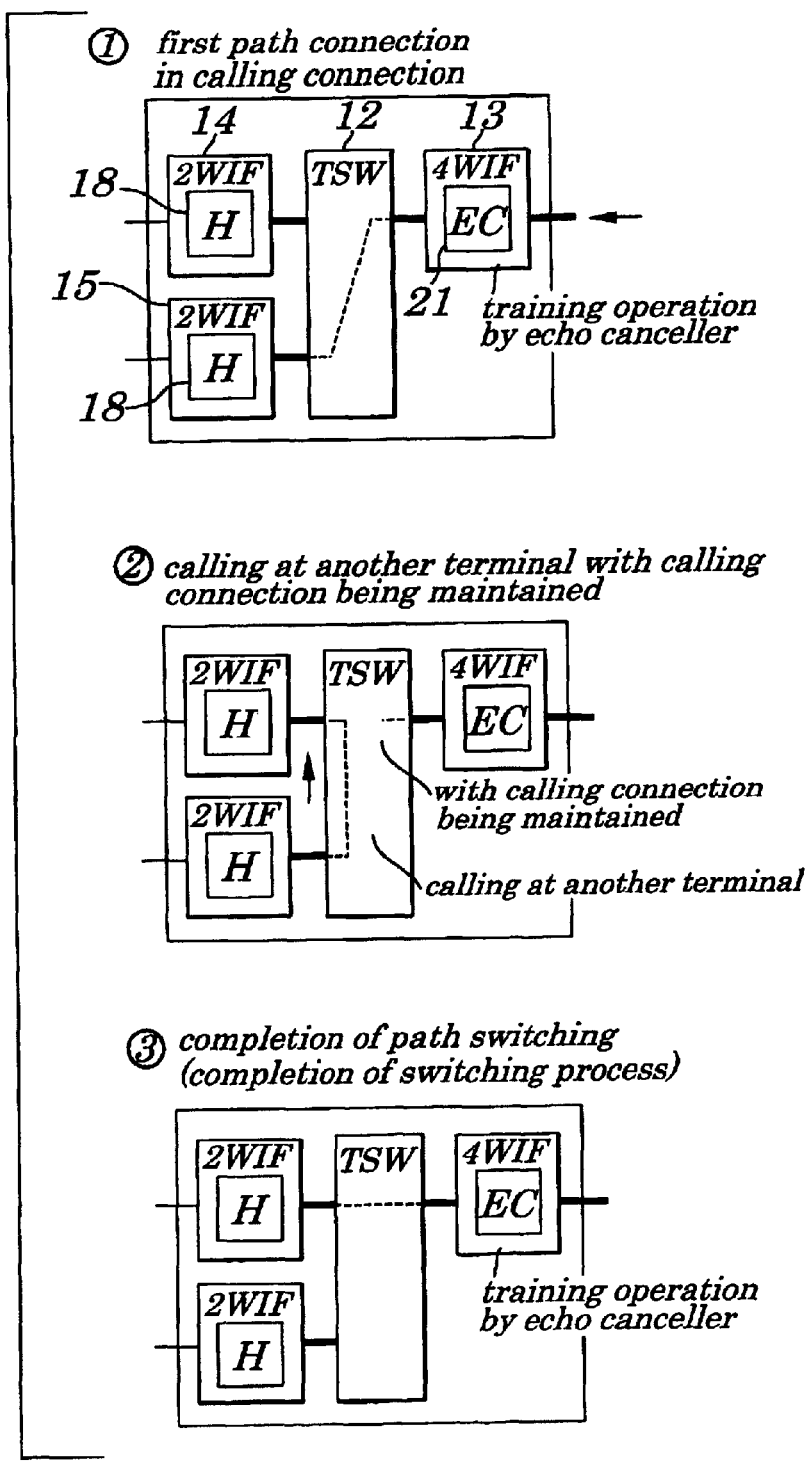
FIG. 4 is a diagram showing a process of changing a path switching (in the case of using a path changing function) in communication connection according to the embodiment of the present invention.
Figure 5:
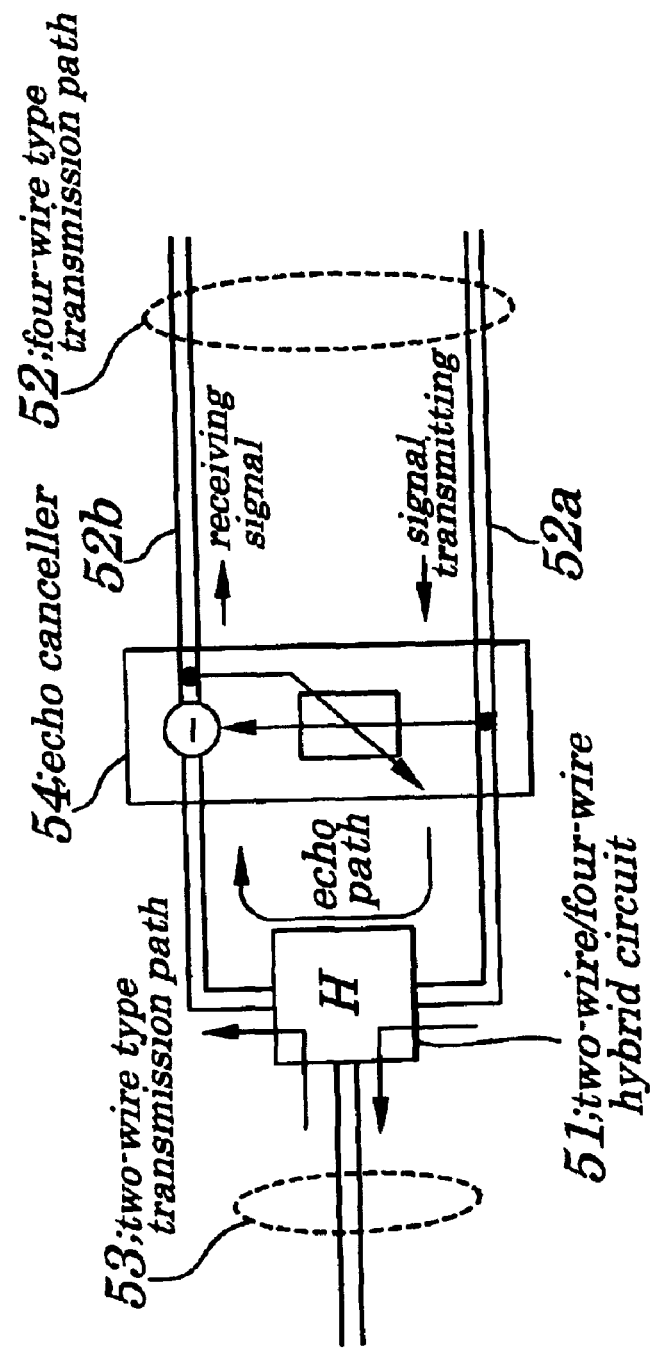
FIG. 5 is a diagram illustrating occurrence of an echo in a path having a two-wire/four-wire hybrid circuit and configurations of an echo canceller used in a conventional communication system.

Next, operations of training control for the echo canceller 21 in the communication system of the embodiment are described. FIG. 4 shows a process of changing a path (in the case of using path changing functions) in the case of path changing in communication connection. Description of the control device 11 or a like is omitted. Now let it be assumed that, as shown by the number ①  in FIG. 4, a signal is transmitted through the four-wire interface (not shown) housed in the four-wire type line interface device 13 to the two-wire type terminal 17. The four-wire type line interface device 13 informs the control device 11 that the signal has been transmitted to the two-wire type terminal 17. The control device 11 judges from information about a device to be connected that the device to be connected is the two-wire type terminal 17 which is housed in the two-wire type line interface device 15 and has the time-division switch 12 be switched to form a path between the four-wire interface device 13 and the two-wire type line interface device 15 and controls so as to do connecting of the communication path and switching of communication line. The two-wire type line interface device 15 calls the two-wire type terminal 17 and monitors its response. When the two-wire type terminal 17 makes a response, the two-wire type line interface device 15 informs the control device 11 that the response was made. The control device 11, when receiving a notification about the response, transmits a training control signal to instruct a training operation to be started to the four-wire type line interface device 13.

The four-wire type line interface device 13, based on the instruction for start of the training operation by the training control signal fed from the control device 11, switches an input of the echo canceller 21 to an input of a training signal using the switch circuit 22 and, after the training signal has been fed for a specified period of time, again switches the input to an ordinary input. At this point, in the connection path through the four-wire type line interface device 13 to the two-wire type terminal 17, a training operation is performed by the echo canceller 21 to learn a transmission characteristic of an echo path being formed in the two-wire/four-wire hybrid circuit 18 in the two-wire type line interface device 15 and the training operation converges. Since, at the time when speech is actually started between terminals, the training operation of the echo canceller 21 has been completed, speech being free from an echo is made possible.

As shown by the number ② in FIG. 4, as a process of forming (changing) a path in communication connection in the line switching processing unit 10, the two-wire type terminal 17 switches the connection to the four-wire type line interface device 13 to another terminal connected to the two-wire type line network 16. The two-wire type terminal 17 transmits a signal to another terminal being connected to the two-wire type line network 16 with the connection to the four-wire type line interface device 13 being maintained. At this point, the control device 11 switches from the connection of the four-wire type line interface device 13 to the two-wire type line interface device 15 to the connection of the two-wire type line interface device 14 and the two-wire type line interface device 15. At this point, the echo canceller 21 being housed in the four-wire type line interface device 13 still remains in a state where a training operation to learn a transmission characteristic of an echo path having been formed immediately before that time in the path connected to the two-wire type line interface device 15 has been performed.

When speech (calling) between the two-wire type terminal 17 and a terminal being connected to the two-wire type line network 16 is terminated and speech through the two-wire type terminal 17 is stopped, the connection to the four-wire type line interface device 13 is switched to connection between the two-wire type line interface device 14 and the terminal being connected to the two-wire type line network 16 and, as a result, a series of the switching processes is completed, as shown by the number ③ in FIG. 4.

Now, first connection has been switched and, at this point, path connection has been switched and at the same time an echo path has been also changed. Therefore, a training operation to learn a transmission characteristic of a newly formed echo path has to be performed by the echo canceller 21 in the four-wire type line interface device 13 (otherwise, an echo cannot be suppressed in speech being made immediately after the change of the echo path has been made and it is inevitable that an echo is heard during a period of time until the training operation by the echo canceller 21 is converged). The control device 11, after having recognized that new connection has been established between the four-wire type line interface device 13 and the two-wire type line interface device 14, transmits a training control signal to the four-wire type line interface device 13 to have the echo canceller 21 start a training operation. This causes the echo canceller 21 to again perform the training operation immediately after a new path has been set and then, when speech is started, the training operation to learn a transmission characteristic of a newly formed path has been completed and put into a state where an echo suppressing function is effective, which enables speech being free from an echo. Thus, every time a communication path is changed even with connection being maintained for speech, a training operation is performed by the echo canceller 21, and therefore speech quality with an echo being suppressed can be ensured.

It is apparent that the present invention is not limited to the above embodiments but may be changed and modified without departing from the scope and spirit of the invention. For example, in the above embodiment, when the control device 11 exerts control on various service functions of switching communication lines or changing communication paths, or like and, at a same time, control on start of a training operation of the echo canceller 21, transmits a training control signal to directly have the switching circuit 22 in the four-wire type line interface device 13 do switching of a signal to be fed to the echo canceller 21. However, the present invention is not limited to this method. That is, the control device 11, when a path has been set, may inform the four-wire type line interface device 13 of new establishment of path connection and the four-wire type line interface device 13 may judge based on the notification and exert control on switching so as to have the training signal source feed a training signal to the echo canceller 21, in other words, components other than the control device 11 may judge and control switching for feeding a training signal to the echo canceller 21.

What is claimed is:

1. A communication system having a time-division switch; a plurality of two-wire/four-wire hybrid circuits coupled to the time-division switch, the two-wire/four-wire hybrid circuits producing respective echos; a plurality of two-wire type transmission paths respectively coupled to the two-wire/four-wire hybrid circuits; an echo canceller coupled to the time-division switch to suppress the echos produced by the two-wire/four-wire hybrid circuits; and a four-wire type transmission path coupled to the echo canceller, the communication system comprising:

- a control device operable to control the time-division switch to selectively couple one of the plurality of two-wire type transmission paths to the four-wire type transmission paths to establish a communication path in the communication system;
- a training signal source operable to output a training signal to permit the echo canceller to perform and complete a training operation; and
- a switching circuit operable to be acted upon by the control device to selectively switch a signal to be fed to the echo canceller between an ordinary signal and the training signal, the control device being operable to control the switching circuit to feed the training signal to the echo canceller every time a new communication path is established through the line communication system.

2. The communication system according to claim 1, wherein the control device controls the switching circuit to feed the training signal to the echo canceller so that the echo canceller performs and completes the training operation after the control device establishes a new communication path through the communication system.

3. The communication system according to claim 2, wherein the control device changes the communication path through the communication system while a call connection is still established, the control device controlling the switching circuit to feed the training signal to the echo canceller every time the control circuit changes the communication path through the communication system while the call connection is still established.

4. The communication system according to claim 1, wherein the control device changes the communication path through the communication system while a call connection is still established, the control device controlling the switching circuit to feed the training signal to the echo canceller every time the control circuit changes the communication path through the communication system while the call connection is still established.

5. A line switching system for switching between a two-wire type line and a four-wire type line, the line switching system comprising:

- a two-wire type line interface device having a two-wire/four-wire hybrid circuit producing an echo, the two-wire type line interface device being coupled to the two-wire type line;
- an echo canceller for canceling the echo produced by the two-wire/four-wire hybrid circuit of the two-wire type line interface device;
- a training signal source operable to output a training signal to permit the echo canceller to perform and complete a training operation;
- a four-wire type line interface device coupled to four-wire type line, the four-wire type line interface device having a switching circuit arranged therein, the switching circuit being operable to be acted upon by the control device to selectively switch a signal to be fed to the echo canceller between an ordinary signal and the training signal;
- a time-division switch coupled to the two-wire type line interface device and to the four-wire type line interface device;
- a control device operable to control the time-division switch to selectively couple one of a plurality of lines for voice speech from the two-wire type line to the four-wire type line to establish a communication path for speech through the line switching system, the control device being operable to control the switching circuit of the four-wire type line interface device to feed the training signal output by the training signal source to the echo canceller so that the echo canceller performs and completes the training operation every time a new communication path for speech is established through the line switching system.

6. The line switching system according to claim 5, wherein the control device controls the switching circuit to feed the training signal to the echo canceller so that the echo canceller performs the training operation every time the control device establishes a new communication path for speech through the switching system, the control device controlling the switching circuit to feed the training signal to the echo canceller immediately after the new communication path for speech is established.

7. The line switching system according to claim 6, wherein the control device changes the communication path for speech through the switching system while a call connection is still established, the control device controlling the switching circuit to feed the training signal to the echo canceller when the control circuit changes the communication path for speech through the switching system.

8. The line switching system according to claim 5, wherein the control device changes the communication path for speech through the switching system while a call connection is still established, the control device controlling the switching circuit to feed the training signal to the echo canceller when the control circuit changes the communication path for speech through the switching system.

9. A communication system having a time-division switch; a plurality of two-wire/four-wire hybrid circuits coupled to the time-division switch, the two-wire/four-wire hybrid circuits producing respective echos; a plurality of two-wire type transmission paths respectively coupled to the two-wire/four-wire hybrid circuits; an echo canceller coupled to the time-division switch to suppress the echos produced by the two-wire/four-wire hybrid circuits; and a four-wire type transmission path coupled to the echo canceller, the communication system comprising:

- a control device operable to control the time-division switch to selectively couple one of the plurality of two-wire type transmission paths to the four-wire type transmission paths to establish a communication path between the communication system;
- a training signal source operable to output a training signal to permit the echo canceller to perform a prompt training operation to learn a transmission characteristic of a new echo path; and
- a switching circuit operable to be acted upon by the control device to selectively switch a signal to be fed to the echo canceller between an ordinary signal and the training signal, the control device being operable to control the switching circuit to feed the training signal output by the training signal source to the echo canceller so that the echo canceller performs the prompt training operation every time a new communication path is established through the communication system.

* * * * *